US011983103B2

United States Patent
Jagpal et al.

(10) Patent No.: US 11,983,103 B2
(45) Date of Patent: May 14, 2024

(54) SYSTEM AND METHOD FOR REDUCING NOISE AND FALSE POSITIVES FOR ENSURING TEST COVERAGE PRIOR TO SUBMISSION

(71) Applicant: JPMorgan Chase Bank, N.A., New York, NY (US)

(72) Inventors: Jay Jagpal, Glasgow (GB); Stacy Newman Kandel, Easton, PA (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 305 days.

(21) Appl. No.: 17/651,353

(22) Filed: Feb. 16, 2022

(65) Prior Publication Data

US 2023/0297493 A1  Sep. 21, 2023

(51) Int. Cl.
*G06F 11/36* (2006.01)
*G06F 21/57* (2013.01)

(52) U.S. Cl.
CPC ........ *G06F 11/3688* (2013.01); *G06F 21/577* (2013.01)

(58) Field of Classification Search
CPC .... G06F 11/36–3696; G06F 8/75; G06F 8/77; G06F 21/57; G06F 21/577
See application file for complete search history.

(56) References Cited

U.S. PATENT DOCUMENTS

| | | | | |
|---|---|---|---|---|
| 9,465,942 | B1 * | 10/2016 | Kane-Parry | G06F 21/125 |
| 9,916,438 | B2 * | 3/2018 | Marti | G06F 21/45 |
| 11,550,569 | B2 * | 1/2023 | Makmel | G06F 21/577 |
| 11,868,768 | B2 * | 1/2024 | Moran | G06F 18/2185 |
| 2023/0359729 | A1 * | 11/2023 | Duggan | G06F 21/563 |
| 2024/0012623 | A1 * | 1/2024 | Ben Salem | G06F 21/577 |

OTHER PUBLICATIONS

Saha, A., et al., Secrets in Source Code: Reducing False Postives Using Machine Learning, 2020 12th Int'l Conf. on Comm. Systems and Networks [online], 2020 [retrieved Feb. 5, 2024], Retreived from Internet: < URL: https://ieeexplore.ieee.org/stamp/stamp.jsp?arnumber=9027350>, pp. 168-175.*

* cited by examiner

*Primary Examiner* — Todd Aguilera
(74) *Attorney, Agent, or Firm* — GREENBLUM & BERNSTEIN, P.L.C.

(57) ABSTRACT

A method for performing reducing noise and false positive event detection in testing is disclosed. The method includes performing scanning of a source file including multiple strings; determining, an entropy value of each string included in the multiple strings; acquiring, from a central repository, a first threshold value; identifying one or more strings having an entropy value higher than the first threshold value; removing the one or more strings having the entropy value higher than the first threshold value from the source file; deriving a second threshold value based on the determined entropy values and the first threshold value; identifying one or more strings having an entropy value lower than the second threshold value; removing the one or more strings having the entropy value lower than the second threshold value from the source file; and executing one or more tests on strings remaining in the source file.

19 Claims, 5 Drawing Sheets

SYSTEM AND METHOD FOR REDUCING NOISE AND FALSE POSITIVES FOR ENSURING TEST COVERAGE PRIOR TO SUBMISSION

TECHNICAL FIELD

This disclosure generally relates to a system and method for reducing noise and false positives in a source file to ensure tests being performed meet software development life cycle (SDLC) standards prior to submission.

BACKGROUND

The developments described in this section are known to the inventors. However, unless otherwise indicated, it should not be assumed that any of the developments described in this section qualify as prior art merely by virtue of their inclusion in this section, or that those developments are known to a person of ordinary skill in the art.

Presently, testing of codebase differs from project to project and from developer to developer making for inconsistencies in testing coverage on a given feature of application. Often, testing coverage can be poor (e.g., incorrect test is performed) or insufficient (e.g., not enough testing is performed prior to deployment), which does not properly protect a clean deployment record by testing coverage files prior to submission, leading to frequent post deployment failures or defects.

Further, conventional scanning of a source code may not account for unique factors present (e.g., known issues, organization resources, and etc.) within an organization and often relies on a generic high threshold, leading to numerous false positives to be detected in response to the scanning performed, or allows for a large number of events to pass through without being detected.

SUMMARY

According to an aspect of the present disclosure, a method for performing reducing noise and false positive event detection in testing is provided. The method includes performing, using a processor and a memory: performing scanning of a source file including multiple strings; determining, an entropy value of each string included in the multiple strings; acquiring, from a central repository, a first threshold value; identifying one or more strings having an entropy value higher than the first threshold value; removing the one or more strings having the entropy value higher than the first threshold value from the source file; deriving a second threshold value based on the determined entropy values and the first threshold value; identifying one or more strings having an entropy value lower than the second threshold value; removing the one or more strings having the entropy value lower than the second threshold value from the source file; and executing one or more tests on strings remaining in the source file.

According to another aspect of the present disclosure, the method further includes selecting the one or more tests to be performed on a user interface provided to a user.

According to another aspect of the present disclosure, the one or more tests are executed after the selecting is performed and the user submits a request to perform the selected one or more tests.

According to yet another aspect of the present disclosure, the method further includes checking an output produced by the executed one or more tests for presence of known issues logged in a central repository; determining whether an issue included in the output matches with one of the known issues logged in the central repository; and removing the issue, when the issue is determined to match with one of the known issues.

According to another aspect of the present disclosure, the method further includes storing the issue in the central repository as a new issue when the issue is determined not to match with any of the known issues.

According to a further aspect of the present disclosure, the method further includes checking an output produced by the executed one or more tests for presence of defects or issues; and storing, in the central repository, scripts associated with the one or more tests when the output produced is determined to be free of defects or issues.

According to yet another aspect of the present disclosure, the first threshold value corresponds to a file type of the source file, such that different threshold values are provided for different file types.

According to a further aspect of the present disclosure, the first threshold value is a moving average value based on previous scans performed.

According to another aspect of the present disclosure, the first threshold value is a value specific to an organization, and accounts for one or more factors unique to the organization.

According to a further aspect of the present disclosure, the deriving of the second threshold value includes: starting with a default nominal value; stochastically measuring a model space via a monotonic sigma function; and adding of independent events through the monotonic sigma function for deriving the second threshold value.

According to a further aspect of the present disclosure, the deriving of the second threshold value includes: starting with a default nominal value; stochastically measuring a model space via a monotonic sigma function; and filing lines into a Merkel graph bound to a larger latent space through the monotonic sigma function.

According to a further aspect of the present disclosure, when a high entropy space is maintained and a low entropy state is calculated, a probability of false positives is reduced.

According to a further aspect of the present disclosure, the first threshold value does not change due to file content or structure, while the second threshold value is based on content of the source file.

According to a further aspect of the present disclosure, the method further includes executing a Merkle tree algorithm for denoting differences across multiple files in an organization for generating of additional vector; and based on the additional vector defined by the differences, determining variants of an entropy across the multiple files for ascertaining a more accurate first threshold value according to a file type.

According to another aspect of the present disclosure, multiple tests is submitted for execution by click of a single button, and the multiple tests are executed automatically with automatically generated test scripts in response to the click of the single button.

According to another aspect of the present disclosure, the sigma monotonic function is based on self-information quantity for the multiple strings.

According to another aspect of the present disclosure, an entropy string below the second threshold value with a moving base threshold is calculated using the Merkel tree algorithm.

According to another aspect of the present disclosure, the moving base threshold is coupled with an entropy Merkel tree above the first threshold value to uniquely identify an entropy string below the second threshold value with security risks.

According to another aspect of the present disclosure, a system for performing reducing noise and false positive event detection in testing is disclosed. The system includes at least one processor; at least one memory; and at least one communication circuit. The at least one processor is configured to: perform scanning of a source file including multiple strings; determine, an entropy value of each string included in the multiple strings; acquire, from a central repository, a first threshold value; identify one or more strings having an entropy value higher than the first threshold value; remove the one or more strings having the entropy value higher than the first threshold value from the source file; derive a second threshold value based on the determined entropy values and the first threshold value; identify one or more strings having an entropy value lower than the second threshold value; remove the one or more strings having the entropy value lower than the second threshold value from the source file; and execute one or more tests on strings remaining in the source file.

According to another aspect of the present disclosure, a non-transitory computer readable storage medium that stores a computer program for performing reducing noise and false positive event detection in testing is disclosed. The computer program, when executed by a processor, causing a system to perform a process including performing scanning of a source file including multiple strings; determining, an entropy value of each string included in the multiple strings; acquiring, from a central repository, a first threshold value; identifying one or more strings having an entropy value higher than the first threshold value; removing the one or more strings having the entropy value higher than the first threshold value from the source file; deriving a second threshold value based on the determined entropy values and the first threshold value; identifying one or more strings having an entropy value lower than the second threshold value; removing the one or more strings having the entropy value lower than the second threshold value from the source file; and executing one or more tests on strings remaining in the source file.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Figure 1:
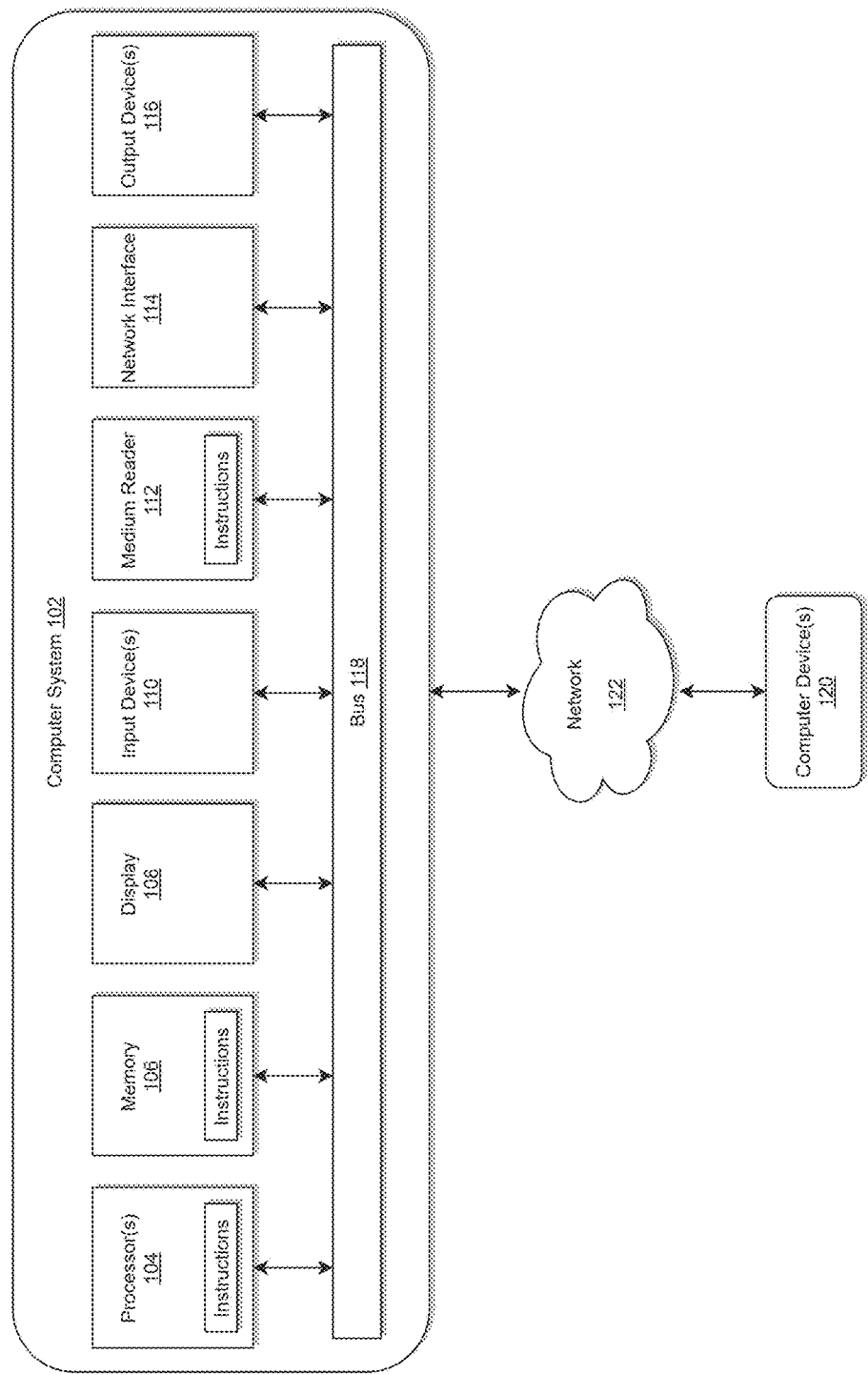
FIG. 1 illustrates a computer system for implementing a test coverage application system in accordance with an exemplary embodiment.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

FIG. 1 illustrates a computer system for implementing a test coverage application system in accordance with an exemplary embodiment.

The system 100 is generally shown and may include a computer system 102, which is generally indicated. The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The network interface 114 may include, without limitation, a communication circuit, a transmitter or a receiver. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and an operation mode having parallel processing capabilities. Virtual computer system processing can be constructed to implement one or more of the methods or functionality as described herein, and a processor described herein may be used to support a virtual processing environment.

Figure 2:
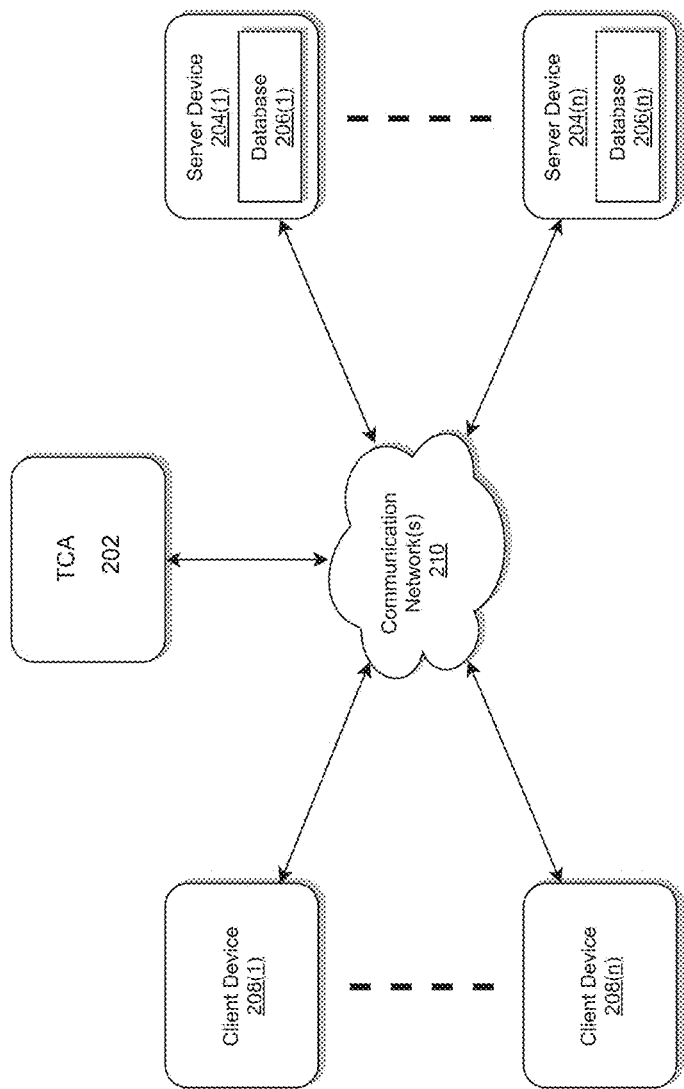
FIG. 2 illustrates an exemplary diagram of a network environment with a test coverage application system in accordance with an exemplary embodiment.

FIG. 2 illustrates an exemplary diagram of a network environment with a test coverage application system in accordance with an exemplary embodiment.

A test coverage application (TCA) system 202 may be the same or similar to the computer system 102 as described with respect to FIG. 1.

The TCA system 202 may store one or more applications that can include executable instructions that, when executed by the TCA system 202, cause the TCA system 202 to perform actions, such as to execute, transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment or other networking environments. The application(s) may be executed within or as virtual machine(s) or virtual server(s) that may be managed in a cloud-based computing environment. Also, the application(s), and even the TCA system 202 itself, may be located in virtual server(s) running in a cloud-based computing environment rather than being tied to one or more specific physical network computing devices. Also, the application(s) may be running in one or more virtual machines (VMs) executing on the TCA system 202. Additionally, in one or more embodiments of this technology, virtual machine(s) running on the TCA system 202 may be managed or supervised by a hypervisor.

In the network environment 200 of FIG. 2, the TCA system 202 is coupled to a plurality of server devices 204(1)-204(n) that hosts a plurality of databases 206(1)-206(n), and also to a plurality of client devices 208(1)-208(n) via communication network(s) 210. A communication interface of the TCA system 202, such as the network interface 114 of the computer system 102 of FIG. 1, operatively couples and communicates between the TCA system 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the TCA system 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The TCA system 202 may be a standalone device or integrated with one or more other devices or apparatuses, such as one or more of the server devices 204(1)-204(n), for example. In one particular example, the TCA system 202 may be hosted by one of the server devices 204(1)-204(n), and other arrangements are also possible. Moreover, one or more of the devices of the TCA system 202 may be in the same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the TCA system 202 via the communication network(s) 210 according to the HTTP-based protocol, for example, although other protocols may also be used. According to a further aspect of the present disclosure, in which the user interface may be a Hypertext Transfer Protocol (HTTP) web interface, but the disclosure is not limited thereto.

The server devices 204(1)-204(n) may be hardware or software or may represent a system with multiple servers in a pool, which may include internal or external networks. The server devices 204(1)-204(n) hosts the databases 206(1)-206(n) that are configured to store metadata sets, data quality rules, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(n) or other client devices 208(1)-208(n).

According to exemplary embodiments, the client devices 208(1)-208(n) in this example may include any type of computing device that can facilitate the implementation of the TCA system 202 that may efficiently provide a platform for implementing a cloud native TCA module, but the disclosure is not limited thereto.

The client devices 208(1)-208(n) may run interface applications, such as standard web browsers or standalone client applications, which may provide an interface to communicate with the TCA system 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the TCA system 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the TCA system 202, the server devices 204(1)-204(n), or the client devices 208(1)-208(n), for example, may be configured to operate as virtual instances on the same physical machine. For example, one or more of the TCA system 202, the server devices 204(1)-204(n), or the client devices 208(1)-208(n) may operate on the same physical device rather than as separate devices communicating through communication network(s) 210. Additionally, there may be more or fewer TCA systems 202, server devices 204(1)-204(n), or client devices 208(1)-208(n) than illustrated in FIG. 2. According to exemplary embodiments, the TCA system 202 may be configured to send code at run-time to remote server devices 204(1)-204(n), but the disclosure is not limited thereto.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
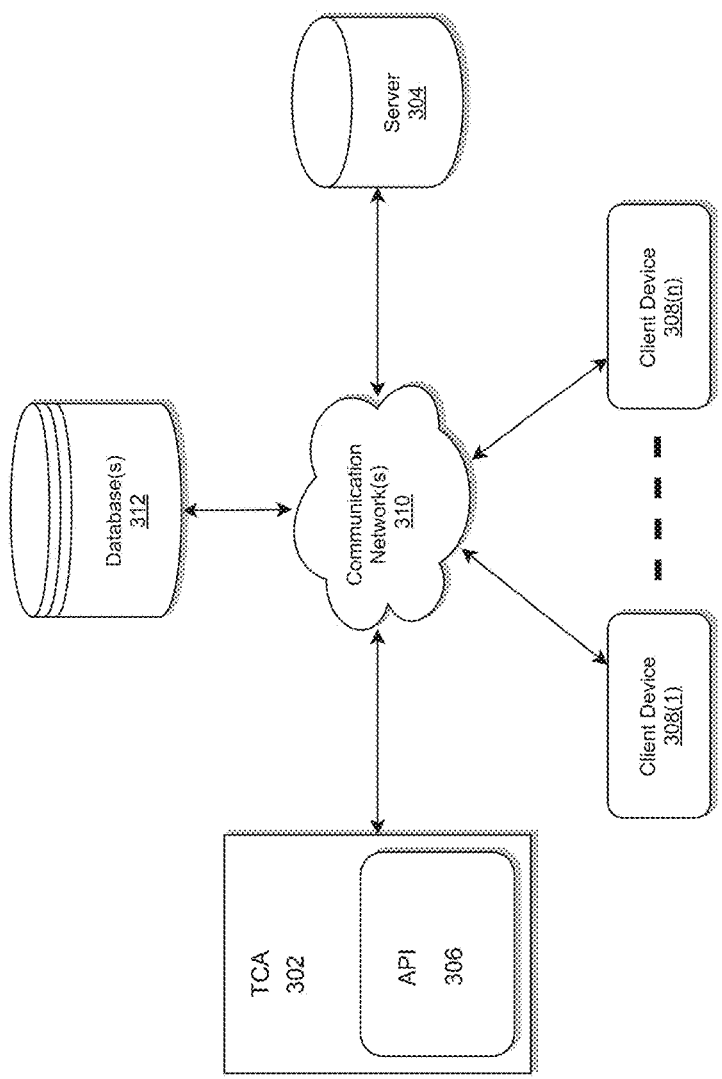
FIG. 3 illustrates a system diagram for implementing a test coverage application system in accordance with an exemplary embodiment.

FIG. 3 illustrates a system diagram for implementing a test coverage application system in accordance with an exemplary embodiment.

As illustrated in FIG. 3, the system 300 may include a test coverage application (TCA) system 302 within which a group of API modules 306 is embedded, a server 304, a database(s) 312, a plurality of client devices 308(1) . . . 308(n), and a communication network 310.

According to exemplary embodiments, the TCA system 302 including the API modules 306 may be connected to the server 304, and the database(s) 312 via the communication network 310. Although there is only one database has been illustrated, the disclosure is not limited thereto. Any number of databases may be utilized. The TCA System 302 may also be connected to the plurality of client devices 308(1) . . . 308(n) via the communication network 310, but the disclosure is not limited thereto.

According to exemplary embodiment, the TCA system 302 is described and shown in FIG. 3 as including the API modules 306, although it may include other rules, policies, modules, databases, or applications, for example. According to exemplary embodiments, the database(s) 312 may be embedded within the TCA system 302. According to exemplary embodiments, the database(s) 312 may be configured to store configuration details data corresponding to a desired data to be fetched from one or more data sources, user information data etc., but the disclosure is not limited thereto.

According to exemplary embodiments, the API modules 306 may be configured to receive real-time feed of data or data at predetermined intervals from the plurality of client devices 308(1) . . . 308(n) via the communication network 310.

The API modules 306 may be configured to implement a user interface (UI) platform that is configured to enable test coverage application as a service for a desired data processing scheme. The UI platform may include an input interface layer and an output interface layer. The input interface layer may request preset input fields to be provided by a user in accordance with a selection of an automation template. The UI platform may receive user input, via the input interface layer, of configuration details data corresponding to a desired data to be fetched from one or more data sources. The user may specify, for example, data sources, parameters, destinations, rules, and the like. The UI platform may further fetch the desired data from said one or more data sources based on the configuration details data to be utilized for the desired data processing scheme, automatically implement a transformation algorithm on the desired data corresponding to the configuration details data and the desired data processing scheme to output a transformed data in a predefined format, and transmit, via the output interface layer, the transformed data to downstream applications or systems.

The plurality of client devices 308(1) . . . 308(n) are illustrated as being in communication with the TCA system 302. In this regard, the plurality of client devices 308(1) . . . 308(n) may be "clients" of the TCA system 302 and are described herein as such. Nevertheless, it is to be known and understood that the plurality of client devices 308(1) . . . 308(n) need not necessarily be "clients" of the TCA system 302, or any entity described in association therewith herein. Any additional or alternative relationship may exist between either or both of the plurality of client devices 308(1) . . . 308(n) and the TCA system 302, or no relationship may exist.

The first client device 308(1) may be, for example, a smart phone. Of course, the first client device 308(1) may be any additional device described herein. The second client device 308(n) may be, for example, a personal computer (PC). Of course, the second client device 308(n) may also be any additional device described herein. According to exemplary embodiments, the server 304 may be the same or equivalent to the server device 204 as illustrated in FIG. 2.

The process may be executed via the communication network 310, which may comprise plural networks as described above. For example, in an exemplary embodiment, one or more of the plurality of client devices 308(1) . . . 308(n) may communicate with the TCA system 302 via broadband or cellular communication. Of course, these embodiments are merely exemplary and are not limiting or exhaustive.

The computing device 301 may be the same or similar to any one of the client devices 208(1)-208(n) as described with respect to FIG. 2, including any features or combination of features described with respect thereto. The TCA system 302 may be the same or similar to the TCA system 202 as described with respect to FIG. 2, including any features or combination of features described with respect thereto.

Figure 4:
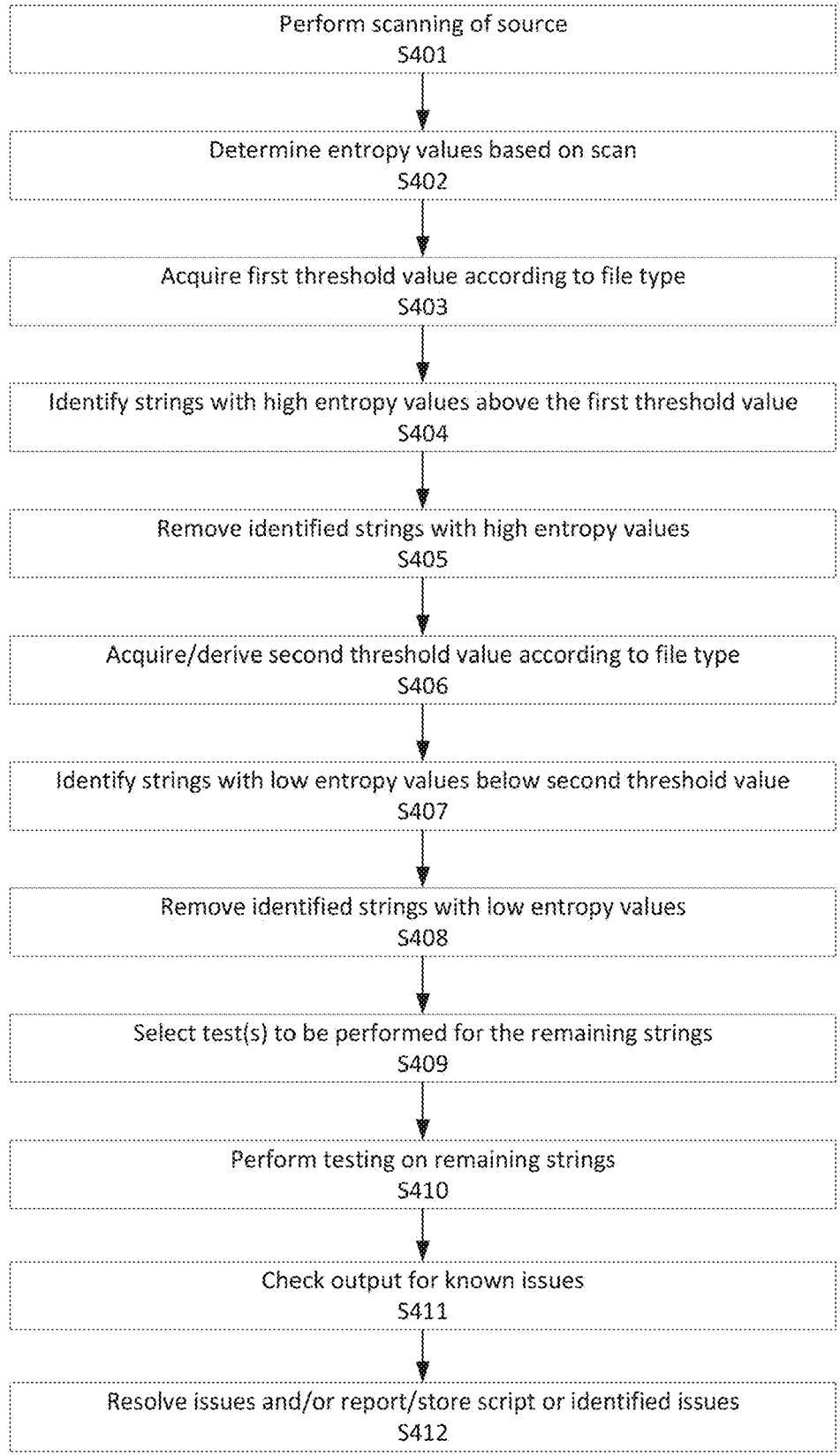
FIG. 4 illustrates a method for modifying source file for testing based on high-low thresholds in accordance with an exemplary embodiment.

FIG. 4 illustrates a method for modifying source file for testing based on high-low thresholds in accordance with an exemplary embodiment.

According to exemplary aspects, a test coverage application may be a standalone application with little or no dependencies. In an example, the test coverage application may be centrally located and provided or accessed via an API. Further, the test coverage application may not require a separate installation process to be applied to any function/application/files to be submitted for deployment. Upon execution of the test cover application for the respective function/application/file, a predefined array of checks may be performed on respective source code to verify or ensure that the respective function/application/file is in proper form for SDLC submission. More specifically, the test coverage application may be utilized to perform one or tests on the tests set of the respective function/application/files to ensure that various tests configured for the respective function/application/files are properly configured to ensure adequate testing is performed prior to release. For example, a developer may be able to ensure test outputs are correct for the developed function or test prior to submitting corresponding files to one or more SDLC sources.

In an example, the test coverage application may receive a coverage file (e.g., cobertura.xml, jaccoco.exec or etc.) to be asserted upon. However, aspects of the present disclosure are not limited thereto, such that if no file is provided to the test coverage application, the test coverage application may assert a first valid file type.

Further to the above, the test coverage application may be utilized for performing a more advanced entropy scanning operation for reducing noise and/or reduction of false positives. By reducing noise and reduction of false positives, quality or accuracy of the testing results may be higher, and unnecessary utilization of technical resources (e.g., memory, CPU, network bandwidth, and etc.) may be reduced. In an example, noise or false positives may be reduced by extending aspects of various entropy scanning to factor in an organization specific resources and/or known issues at the organization.

As illustrated in FIG. 4, a high-low flip method may be performed to filter or remove extraneous data (e.g., comments, empty spaces, and etc.) and data strings having an entropy value above a global threshold value for a respective file type. The high-low flip method of FIG. 4 initially performs a scanning of a source code or file in operation S401. In an example, the test coverage application may be accessed via an API for performing a scanning operation of the source code or file. The test coverage application may be an enterprise scanner and may perform scanning using one or more file based scanning methods. The scanning performed, may for example be entropy scanning. However, aspects of the present disclosure are not limited thereto, such that the method may incorporate multiple file based scanning methods. The file based scanning methods may include, without limitation, a high entropy string scanning, a repo scanning, a secret scanning, and the like.

In an example, high entropy string may refer to characters within content that matches a calculation too complex for a human to knowingly write. Repo scanning may refer to an entire box of sources as an entity to scan, and looks for general patterns and file structures known for security issues. Secret scanning may involve looking at file names and content for known patterns of security, such as a SSH private key or a pass file.

In operation S402, entropy score or value may be determined for the scanned source code or file. According to exemplary aspects, entropy score or value may be determined for each string or line in the source code or file. However, aspects of the present disclosure are not limited thereto, such that entropy score may be determined in differing units of data.

An entropy score or value may be interpreted as an average rate at which information is produced by a stochastic source of data. When a data source produces a low-probability value (i.e., when a low-probability event occurs), an event may be understood to carry more information than when a data source produces a high-probability value. In an example, information amount included in the information of an event may be represented by Shannon's self-information quantity. Further, information amount included in an event may be interpreted as a surprisal. Accordingly, an amount of information conveyed by each individual event then may become a random variable whose expected value may be the information entropy.

For example, if a random variable is X, and a number of possible outcomes is xi each with probability PX(xi), an entropy represented as H(X) may be exemplarily calculated based on the equation below:

$$H(X) = -\text{sumi} PX(xi) \log bPX(x0) = \text{sumi} PX(xi) IX(xi) = E[IX] H(X) = -\text{sumi} PX(xi) \log bPX(xi) = \text{sumi} PX(xi) IX(xi) = E[IX]$$

Equation 1

Further, Shannon's self-information quantity may be calculated using an exemplary equation provided below:

$$\displaystyle \mathrm{H}(X) = -\sum_{i=1}^{n} \mathrm{P}(x_i) \log_b \mathrm{P}(x_i) \qquad \text{Equation 2}$$

In operation S403, a first threshold value according to a file type of the source code or file is acquired. The first threshold value may indicate a threshold for determining whether a string is a high entropy string or not. According to exemplary aspects, the first threshold value may a moving average value may be an averaged value of first threshold values accumulated throughout an organization. In an example, the first threshold value may be a global value that is applied throughout the organization.

More specifically, the first threshold value may be established by collecting first threshold values from previous scans performed on other source codes or files within an organization. According to exemplary aspects, an organization specific threshold value may account for organization specific resources, limitations, known issues and the like. In an example, the organization specific threshold value may updated or adjusted periodically or in real-time to account for changes to various factors present at the organization (e.g., addition/deletion/modification of resources, new logged issues, resolved issues and the like). Further, the organization specific threshold values may be collected for other entropy scans, which may be averaged over time to provide a more accurate threshold value. In an example, the threshold value may be an average for an entire duration of scans performed, or may be an average of a specified duration in time (e.g., last 3 months). However, aspects of the present disclosure are not limited thereto, such that the threshold values may be averaged based on last change to a system configuration. Moreover, the threshold values may be separately averaged according to a file type, a subdivision within an organization, or other grouping mechanism.

According to exemplary aspects, the first threshold values collected within the organization may be different from an industry standard value, which may be too low or too high for the respective organization. A threshold value that is too low may cause more false positive events to be retained for testing, and a threshold value that is too high may cause important or anomalous events not to be captured. Accordingly, identifying an accurate threshold value for the specific organization may reduce a number of false positives, and/or reduce a number of events for testing/resolution. Such a result may additionally lead to conservation or more efficient usage of technical resources.

Further, according to additional aspects of the present disclosure, the first threshold value acquired may be specific or adjusted according to a file type. For example, an algorithm, such as a Merkle tree algorithm, may be utilized to determine a threshold value according to a file type. More specifically, the Merkle tree algorithm may be utilized to quickly denote differences between high values and low values from previous scans, which may provide an additional vector for determining variants of entropy values across multiple files for identifying a more accurate level of entropy according to the file type. For example, it may note that less false positives are present for QR's code, or a stronger/higher threshold value may be required for dev projects with 50 loc. Based on its analysis, different threshold value may be applied to different file types.

Further, if Merkel tree algorithm is utilized, a low entropy string with a moving base threshold or a discount may be calculated. In an example, the moving base threshold or discount may be coupled with a high entropy Merkel tree (e.g., above a high entropy threshold) to uniquely identify low-entropy string (e.g., below low entropy threshold) with high security risks (e.g., security risks above a predetermined threshold).

In operation S404, strings within the source code or file having entropy values above the first threshold value are identified. According to exemplary aspects, strings within entropy values above the first threshold values may be determined to be highly random. In an example, such strings may include characters that match a calculation too complex for a human to knowingly write or may include potential security issues. Further, such strings may additionally include issues or bugs known at the organization.

In operation S405, the identified strings having entropy values above the first threshold value are then removed from the source code or file. In an example, such strings may be understood as being problematic (e.g., known issues, high probability errors, and the like) and removed from consideration.

In operation S406, a second threshold value according to a file type of the source code or file is acquired or derived. The second threshold value may indicate a threshold for determining whether a string is a low entropy string or not. In an example, the second threshold value may be derived from the first threshold value (e.g., flip of the first threshold value). According to exemplary aspects, the second threshold value may be a fluctuating threshold value, which may be different between source files based on their contents.

According to exemplary aspects, for a given source file or code, an aggregative threshold value may start with a nominal value and stochastically measures a model space via a monotonic sigma function. By adding independent events through the monotonic sigma function, a lower entropy threshold may be derived based on overall content of the source file. In an example, the aggregative threshold value may start with the nominal value and file lines into a Merkle graph bound to a larger latent space through the monotonic sigma function. The two vectors, high and low entropy levels, applied through a discount variant for a given model may provide an overall result homogeneous to a data source through additive events for deriving the lower entropy threshold. The lower entropy threshold may be a fluid (i.e., not static) value. However, aspects of the present disclosure are not limited thereto, such that the lower entropy threshold may be a moving average, which may be an averaged value of second threshold values accumulated throughout an organization. In an example, the second threshold value may be a global value that is applied throughout the organization.

In operation S407, strings within the source code or file having entropy values below the second threshold value are then identified. According to exemplary aspects, strings within entropy values below the second threshold values may be determined not to be random. In an example, such strings may include characters corresponding to, for example, comments, empty space and the like, for which testing or additional scanning is unnecessary.

In operation S408, the identified strings having entropy values below the second threshold value are then removed from the source code or file. The removal of the identified strings may help to reduce amount of noise in the source code or file for performing of tests.

In operation S409, the remaining strings of the source code or file are then set for scanning or testing by selection of one or more tests to be performed. According to exemplary aspects, the testing coverage application may provide a user interface for testing of the remaining strings of the source code or file. The user interface may present a user with a list of tests that may be selected for testing of the source code or file. The lists of tests available for the source code or file may be populated based on the file type of the source code or file to be tested. In an example, one or more tests may be selected, and performance of the selected one or more tests may be triggered by clicking or executing of a single button or command.

However, aspects of the present disclosure are not limited thereto, such that tests to be performed may be automatically selected and executed upon applying the test coverage application on the source code or file based on one or more machine learning (ML) or artificial intelligence (AI) algorithms. In an example, AI or ML algorithms may be executed to perform data pattern detection, and to provide an output or render a decision based on the data pattern detection. More specifically, an output may be provided based on a historical pattern of data, such that with more data or more recent data, more accurate outputs and/or decisions may be provided or rendered. Accordingly, the ML or AI models may be constantly updated after a predetermined number of runs or iterations. According to exemplary aspects, machine learning may refer to computer algorithms that may improve automatically through use of data. Machine learning algorithm may build an initial model based on sample or training data, which may be iteratively improved upon as additional data are acquired.

More specifically, machine learning/artificial intelligence and pattern recognition may include supervised learning algorithms such as, for example, k-medoids analysis, regression analysis, decision tree analysis, random forest analysis, k-nearest neighbors analysis, logistic regression analysis, 5-fold cross-validation analysis, balanced class weight analysis, and the like. In another exemplary embodiment, machine learning analytical techniques may include unsupervised learning algorithms such as, for example, Apriori analysis, K-means clustering analysis, etc. In another exemplary embodiment, machine learning analytical techniques may include reinforcement learning algorithms such as, for example, Markov Decision Process analysis, and the like.

In another exemplary embodiment, the ML or AI model may be based on a machine learning algorithm. The machine learning algorithm may include at least one from among a process and a set of rules to be followed by a computer in calculations and other problem-solving operations such as, for example, a linear regression algorithm, a logistic regression algorithm, a decision tree algorithm, and/or a Naive Bayes algorithm.

In another exemplary embodiment, the ML or AI model may include training models such as, for example, a machine learning model which is generated to be further trained on additional data. Once the training model has been sufficiently trained, the training model may be deployed onto various connected systems to be utilized. In another exemplary embodiment, the training model may be sufficiently trained when model assessment methods such as, for example, a holdout method, a K-fold-cross-validation method, and a bootstrap method determine that at least one of the training model's least squares error rate, true positive rate, true negative rate, false positive rate, and false negative rates are within predetermined ranges.

In another exemplary embodiment, the training model may be operable, i.e., actively utilized by an organization, while continuing to be trained using new data. In another exemplary embodiment, the ML or AI models may be generated using at least one from among an artificial neural network technique, a decision tree technique, a support vector machines technique, a Bayesian network technique, and a genetic algorithms technique.

In operation S410, the selected tests are then automatically performed on the remaining strings of the source code or file. According to exemplary aspects, the selected tests may be executed in response to clicking of a button (e.g., a submit button) on the user interface provided by the test coverage application. However, aspects of the present disclosure are not limited thereto, such that the tests to be performed may be automatically selected and executed for the source code or file. Further, upon clicking of the button, test scripts for the selected tests may be automatically generated or retrieved for automated execution of the selected tests.

In operation S411, outputs or resultants of the executed tests are checked for issues and for known issues. According to exemplary aspects, the known issues may be checked against a central repository of known issues (e.g., issues or bugs known to exist in the organization) and logged/reported. Further, the known issues are removed from further action. The remaining issues are sent to a technical support staff for resolution/review. If a new issue is uncovered or identified, the newly identified issue or bug may be reported and/or stored in the central repository in operation S412 so that other scans/tests performed are aware of such issues. Also, if no issues are identified from the testing (or a test that is deemed to be satisfactory is identified), scripting for the testing or scanning may be sent to a central repository for future use in operation S412.

Figure 5:
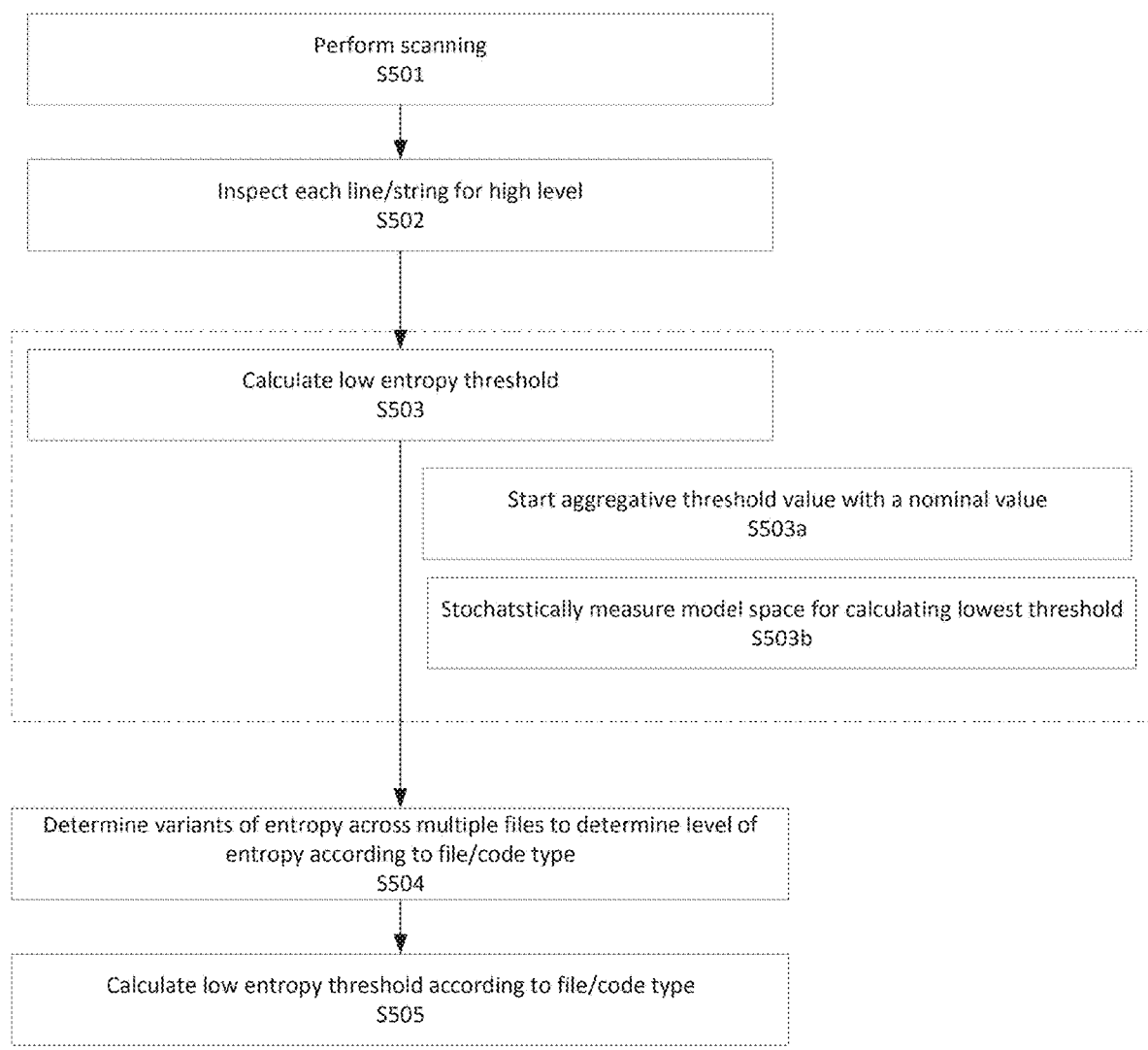
FIG. 5 illustrates a method for deriving a fluid lower threshold in accordance with an exemplary embodiment.

FIG. 5 illustrates a method for deriving a fluid lower threshold in accordance with an exemplary embodiment.

In operation S501, scanning is performed on the source code or file. In an example, one or more scanning methods may be utilized for determining an entropy value for each string included in the source code or file. According to exemplary aspects, entropy may be interpreted as an average rate at which information is produced by stochastic sources of data. An entropy value may exemplarily be calculated using equation 1 noted above. When a data source produces a low-probability value (i.e., when a low-probability event occurs), the event carries more information than when the data source produces a high-probability value. Further, amount of information may be represented by Shannon's self-information quantity (also interpreted as information content, surprisal, or Shannon information). Shannon's self-information quantity may be a basic quantity derived from a probability of a particular event occurring from a random variable. Also, Shannon's self-information quantity may be exemplarily determined using equation 2 noted above. An amount of information conveyed by each individual event then may become a random variable whose expected value may be the information entropy.

For a given probability space, a measurement of rarer events may be intuitively more surprising and yield more information content than more common values. Accordingly, self-information of a variable may be a strictly decreasing monotonic function of probability. Such function may be also referred to as an antitonic function.

In operation S502, the scanning operation inspects each line or string for high level entropy. In an example, whether an entropy is high or not may be determined with respect to a global threshold value that may be applied throughout an organization. Moreover, the global threshold value may be a moving average value that may be reflective of issues, resources, environment and the like present at the respective organization, which may be different from other organization in the industry. Further, the global threshold value leveraged for determining whether a calculated entropy is high or not may be adjusted for a file type of the respective source code or file. Alternatively, separate global threshold values may be stored according to file types present in the organization.

In operation S503, a low entropy level or threshold is calculated. More specifically, for a given source file or code, an aggregative threshold value may start with a nominal value in operation S503a and stochastically measures a model space via a monotonic sigma function in operation S503b. According to exemplary aspects, by addition of independent events through the monotonic sigma function, a lower entropy threshold may be derived based on overall content of the source file. The lower entropy threshold may be a fluid (i.e., not static). In an example, the aggregative threshold value may start with the nominal value and file lines into a Merkle graph bound to a larger latent space through the monotonic sigma function. The two vectors, high and low entropy levels, applied through a discount variant for a given model may provide an overall result homogeneous to a data source through additive events for deriving the lower entropy threshold.

The information content of two independent events may be a sum of each event's information content sigma additivity particular in measure and probability theory. For example, consider two independent random variables X, Y with probability mass functions displaystylepX(x)pX(x)anddisplaystylepY(y)displaystylepY(y) respectively. The joint probability mass function may provide that a log-likelihood of independent events is a sum of log-likelihoods of each event. Interpreting log-likelihood as support or negative surprisal (e.g., a degree to which an event supports a given model (i.e., threshold), a model is supported by an event to the extent that the event is unsurprising. Accordingly, independent events add support. More specifically, the information that the two events together provide for statistical inference, is a sum of their independent information.

In an example, to define in context, if a high entropy space is maintained and a low entropy state is calculated (i.e., bound to a file expressed through monotonic sigma), a probability of false positives is reduced by factors of a file size.

Once the best lowest entropy threshold is derived for the given source file, the lowest entropy threshold is compared with a high entropy threshold, which does not change due to file content or structure. By not statically defining a float, one algorithm may be utilized across all applications with self-awareness to adapt strange files and content.

In operation S504, an algorithm is executed to denote differences between high and low thresholds for across various scanned source files in an organization. For example, a Merkle tree algorithm may be utilized for denoting the differences across multiple files in the organization. Based on the additional vector defined by the differences, variants of an entropy across the multiple files may be determined for ascertaining more accurate entropy thresholds for a type of source code or file given. For example, it may note that less false positives are present for QR's code, or a stronger/higher threshold value may be required for dev projects with 50 loc. Based on its analysis, different threshold value may be applied to different file types.

In operation S505, a low entropy threshold is determined for the respective source file or code according to its type. Through iterations of scanning and acquisition of resulting data, more accurate entropy threshold values may be calculated. Further, additional adjustments may be made based on one or more patterns of testing results detected using one or more AI or ML algorithms. For example, if the AI or ML algorithms determines that organization belonging to a certain geographic region encounters a common issue that is absent from other geographic regions, the low entropy threshold may additionally be adjusted based on locality.

Further, although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for performing reducing noise and false positive event detection in testing, the method comprising:
    performing, using a microprocessor and a memory:
        performing scanning of a source file including a plurality of strings;
        determining, an entropy value of each string included in the plurality of strings;
        acquiring, from a central repository, a first threshold value;
        identifying one or more strings having an entropy value higher than the first threshold value;
        removing the one or more strings having the entropy value higher than the first threshold value from the source file;
        deriving a second threshold value based on the determined entropy values and the first threshold value;
        identifying one or more strings having an entropy value lower than the second threshold value;
        removing the one or more strings having the entropy value lower than the second threshold value from the source file; and
        executing one or more tests on strings remaining in the source file.

2. The method according to claim 1, further comprising:
    selecting the one or more tests to be performed on a user interface provided to a user.

3. The method according to claim 2, wherein the one or more tests are executed after the selecting is performed and the user submits a request to perform the selected one or more tests.

4. The method according to claim 1, further comprising:
    checking an output produced by the executed one or more tests for presence of known issues logged in a central repository;
    determining whether an issue included in the output matches with one of the known issues logged in the central repository; and
    removing the issue, when the issue is determined to match with one of the known issues.

5. The method according to claim 4, further comprising:
    storing the issue in the central repository as a new issue when the issue is determined not to match with any of the known issues.

6. The method according to claim 1, further comprising:
    checking an output produced by the executed one or more tests for presence of defects or issues; and
    storing, in the central repository, scripts associated with the one or more tests when the output produced is determined to be free of defects or issues.

7. The method according to claim 1, wherein the first threshold value corresponds to a file type of the source file, such that different threshold values are provided for different file types.

8. The method according to claim 1, wherein the first threshold value is a moving average value based on previous scans performed.

9. The method according to claim 1, wherein the first threshold value is a value specific to an organization, and accounts for one or more factors unique to the organization.

10. The method according to claim 1, wherein the deriving of the second threshold value comprises:
    starting with a default nominal value;
    stochastically measuring a model space via a monotonic sigma function; and
    adding of independent events through the monotonic sigma function for deriving the second threshold value.

11. The method according to claim 10, wherein the sigma monotonic function is based on self-information quantity for the plurality of strings.

12. The method according to claim 1, wherein the deriving of the second threshold value comprises:
    starting with a default nominal value;
    stochastically measuring a model space via a monotonic sigma function; and
    filing lines into a Merkel graph bound to a larger latent space through the monotonic sigma function.

13. The method according to claim 1, wherein the first threshold value does not change due to file content or structure, while the second threshold value is based on content of the source file.

14. The method according to claim 1, further comprising:
executing a Merkle tree algorithm for denoting differences across multiple files in an organization for generating of additional vector; and
based on the additional vector defined by the differences, determining variants of an entropy across the multiple files for ascertaining a more accurate first threshold value according to a file type.

15. The method according to claim 14, wherein an entropy string below the second threshold value with a moving base threshold is calculated using the Merkel tree algorithm.

16. The method according to claim 15, wherein the moving base threshold is coupled with an entropy Merkel tree above the first threshold value to uniquely identify an entropy string below the second threshold value with security risks.

17. The method according to claim 1, wherein a plurality of tests is submitted for execution by click of a single button, and the plurality of tests are executed automatically with automatically generated test scripts in response to the click of the single button.

18. A system for performing reducing noise and false positive event detection in testing, the system comprising:
at least one microprocessor;
at least one memory; and
at least one communication circuit,
wherein the at least one microprocessor is configured to:
perform scanning of a source file including a plurality of strings;
determine, an entropy value of each string included in the plurality of strings;
acquire, from a central repository, a first threshold value;
identify one or more strings having an entropy value higher than the first threshold value;
remove the one or more strings having the entropy value higher than the first threshold value from the source file;
derive a second threshold value based on the determined entropy values and the first threshold value;
identify one or more strings having an entropy value lower than the second threshold value;
remove the one or more strings having the entropy value lower than the second threshold value from the source file; and
execute one or more tests on strings remaining in the source file.

19. A non-transitory computer readable storage medium that stores a computer program for performing reducing noise and false positive event detection in testing, the computer program, when executed by a processor, causing a system to perform a process comprising:
performing scanning of a source file including a plurality of strings;
determining, an entropy value of each string included in the plurality of strings;
acquiring, from a central repository, a first threshold value;
identifying one or more strings having an entropy value higher than the first threshold value;
removing the one or more strings having the entropy value higher than the first threshold value from the source file;
deriving a second threshold value based on the determined entropy values and the first threshold value;
identifying one or more strings having an entropy value lower than the second threshold value;
removing the one or more strings having the entropy value lower than the second threshold value from the source file; and
executing one or more tests on strings remaining in the source file.

\* \* \* \* \*